(12) United States Patent
Benjamins et al.

(10) Patent No.: US 9,191,881 B2
(45) Date of Patent: Nov. 17, 2015

(54) WIRELESS NETWORK FOR AUTOMATION, REALTIME AND/OR INDUSTRIAL APPLICATIONS

(75) Inventors: Kai Benjamins, Karlsruhe (DE); Stefan Keller, Karlsruhe (DE); Jörg Müller, Linkenheim (DE); Martin Ober, Jiangning (CN); Stephan Wolf, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 1162 days.

(21) Appl. No.: 13/046,499

(22) Filed: Mar. 11, 2011

(65) Prior Publication Data

US 2011/0222510 A1    Sep. 15, 2011

(30) Foreign Application Priority Data

Mar. 12, 2010   (EP) ..................................... 10002646

(51) Int. Cl.
*H04W 48/12* (2009.01)
*H04W 36/30* (2009.01)
*H04W 36/00* (2009.01)
*H04W 52/02* (2009.01)
*H04W 48/20* (2009.01)
(Continued)

(52) U.S. Cl.
CPC .............. *H04W 48/12* (2013.01); *H04W 36/00* (2013.01); *H04W 36/08* (2013.01); *H04W 36/30* (2013.01); *H04W 48/20* (2013.01); *H04W 52/0216* (2013.01); *H04W 88/02* (2013.01); *H04W 88/08* (2013.01); *H04W 92/20* (2013.01)

(58) Field of Classification Search
None
See application file for complete search history.

(56) References Cited

U.S. PATENT DOCUMENTS 4,870,408 A  *  9/1989  Zdunek et al. ................ 370/341
5,970,417 A  *  10/1999  Toyryla et al. ................ 455/519
(Continued)

FOREIGN PATENT DOCUMENTS

CN    1716898       1/2006
CN    101208964     6/2008

OTHER PUBLICATIONS

"LTE: Evolved Universal Terrestrial Radio Access Network (E-UTRAN)" X2 Application Protocol (C2AP) (3GPP TS 36.423 version 9.1.0 Release 9) Technical Specification, European Telecommunications Standards Institute (ETSI) 650, Route des Lucioles No. V9.1.0 pp. 13, 14, 28, 29; Others; 2010.
(Continued)

*Primary Examiner* — Jae Y Lee
*Assistant Examiner* — Andrew Oh
(74) *Attorney, Agent, or Firm* — Cozen O'Connor

(57) ABSTRACT

The present invention describes a wireless network, in particular for automation, realtime and/or industrial applications, having at least two access network nodes and at least one radio station for wireless communication with at least one of the at least two access network nodes, wherein each of the at least two access network nodes uses a data channel selected from a set of available selectable data channels for wireless communication with a radio station assigned to it in each case, wherein a control communication channel which is distinct from the selectable data channels is provided in addition, and each of the at least two access network nodes is embodied for wirelessly sending information messages over the control communication channel and the at least one radio station is embodied for receiving the control communication channel.

25 Claims, 2 Drawing Sheets

(51) Int. Cl.
*H04W 88/02* (2009.01)
*H04W 36/08* (2009.01)
*H04W 88/08* (2009.01)
*H04W 92/20* (2009.01)

(56) References Cited

U.S. PATENT DOCUMENTS

| | | | |
|---|---|---|---|
| 5,987,062 A | 11/1999 | Engwer et al. | |
| 6,052,594 A * | 4/2000 | Chuang et al. | 455/450 |
| 6,192,244 B1 * | 2/2001 | Abbadessa | 455/436 |
| 6,278,876 B1 * | 8/2001 | Joshi et al. | 455/427 |
| 6,347,081 B1 * | 2/2002 | Bruhn | 370/337 |
| 6,487,184 B1 * | 11/2002 | Pecen et al. | 370/329 |
| 6,965,580 B1 * | 11/2005 | Takagi et al. | 370/312 |
| 7,133,380 B1 * | 11/2006 | Winters et al. | 370/329 |
| 7,289,472 B2 * | 10/2007 | Yano et al. | 370/331 |
| 7,385,947 B2 * | 6/2008 | Wu et al. | 370/328 |
| 7,515,945 B2 * | 4/2009 | Ruuska et al. | 455/574 |
| 7,590,100 B2 * | 9/2009 | Smith et al. | 370/346 |
| 7,676,226 B2 * | 3/2010 | Han et al. | 455/436 |
| 7,680,508 B2 * | 3/2010 | Liljestrom et al. | 455/522 |
| 7,680,520 B2 * | 3/2010 | Ruuska et al. | 455/574 |
| 7,751,363 B1 * | 7/2010 | Etemad et al. | 370/329 |
| 7,796,552 B2 | 9/2010 | Julian et al. | |
| 8,175,532 B2 * | 5/2012 | Nanda et al. | 455/63.4 |
| 8,228,830 B2 * | 7/2012 | Babin et al. | 370/311 |
| 8,433,374 B2 * | 4/2013 | Deshpande et al. | 455/574 |
| 8,542,620 B2 * | 9/2013 | Sampathkumar | 370/311 |
| 8,599,729 B2 * | 12/2013 | Gobriel et al. | 370/311 |
| 8,600,456 B2 * | 12/2013 | Meier et al. | 455/574 |
| 2003/0119508 A1 * | 6/2003 | Gwon et al. | 455/436 |
| 2004/0038647 A1 * | 2/2004 | Mahany | 455/73 |
| 2004/0114546 A1 * | 6/2004 | Seshadri et al. | 370/310.2 |
| 2004/0136392 A1 * | 7/2004 | Diachina et al. | 370/431 |
| 2004/0165563 A1 * | 8/2004 | Hsu et al. | 370/338 |
| 2004/0242214 A1 * | 12/2004 | Shibata | 455/417 |
| 2005/0090259 A1 * | 4/2005 | Jain et al. | 455/439 |
| 2005/0124344 A1 * | 6/2005 | Laroia et al. | 455/436 |
| 2005/0197171 A1 * | 9/2005 | Son et al. | 455/574 |
| 2005/0265287 A1 * | 12/2005 | Lee et al. | 370/331 |
| 2006/0025150 A1 * | 2/2006 | Kim et al. | 455/453 |
| 2006/0221993 A1 | 10/2006 | Liao et al. | |
| 2006/0251008 A1 * | 11/2006 | Wu et al. | 370/328 |
| 2006/0270338 A1 | 11/2006 | Mahany | |
| 2006/0270339 A1 * | 11/2006 | Mahany | 455/3.01 |
| 2007/0111667 A1 * | 5/2007 | Kwon et al. | 455/67.11 |
| 2007/0147330 A1 * | 6/2007 | Smith et al. | 370/346 |
| 2007/0197245 A1 * | 8/2007 | Tsubota | 455/509 |
| 2007/0253399 A1 * | 11/2007 | Deshpande et al. | 370/347 |
| 2007/0259700 A1 * | 11/2007 | Meier et al. | 455/574 |
| 2007/0281617 A1 * | 12/2007 | Meylan et al. | 455/41.2 |
| 2008/0056218 A1 * | 3/2008 | Binzel et al. | 370/342 |
| 2008/0176571 A1 * | 7/2008 | Choi | 455/436 |
| 2008/0205345 A1 * | 8/2008 | Sachs et al. | 370/332 |
| 2009/0196211 A1 * | 8/2009 | Wentink | 370/311 |
| 2009/0232115 A1 * | 9/2009 | Horn | 370/338 |
| 2010/0124204 A1 * | 5/2010 | Won | 370/332 |
| 2010/0157941 A1 * | 6/2010 | Raghothaman et al. | 370/331 |
| 2010/0226345 A1 * | 9/2010 | Qu et al. | 370/338 |
| 2010/0284316 A1 * | 11/2010 | Sampathkumar | 370/311 |
| 2011/0158173 A1 * | 6/2011 | Cucala Garcia et al. | 370/328 |

OTHER PUBLICATIONS

"IEEE Standard for Information technology—Telecommunications and information exchange between systems—Local and metropolitan area networks—Specification requirements Part 11" Wireless LAN Medium Access Control (MAC) and Phydical Layer (PHY) specifications Amendment 8: Medium Access Contol (MAC) Qua IEEE Standard . . . pp. 1-189 XPO17601998 ISBN: 978-0-7381-4772-7; Others; 2005.

* cited by examiner

WIRELESS NETWORK FOR AUTOMATION, REALTIME AND/OR INDUSTRIAL APPLICATIONS

BACKGROUND OF THE INVENTION

1. Field of the Invention

The present invention relates to a wireless network, i.e., for automation, realtime and/or industrial applications, having at least two access network nodes and at least one radio station for wirelessly communicating with at least one of the at least two access network nodes, where each of the at least two access network nodes uses a data channel selected from a set of available selectable data channels for wireless communication with a radio station assigned to each access network node.

2. Description of the Related Art

In general, wireless networks are known. For example, US Publication No. 2006/0221993 A1 discloses a wireless local area network (WLAN) having a plurality of access network nodes, i.e., "access points", and a multiplicity of radio stations in the radio coverage area of the access points. In this arrangement, an access point selects, from a plurality of available frequencies, a free frequency on which the access point communicates with the radio stations located within its radio coverage area. In this case, each access point sends a polling message at regular intervals to all of its radio stations, where the message affords the receiving station the opportunity to send data back to the access point. In order to avoid mutual interference among the different access points in the network, the different access points communicate with their respective radio stations on different WLAN channels that are assigned to different frequencies.

It is a shortcoming of the conventional networks that a radio station looking for the best possible access point for communication must search through different radio frequencies for corresponding signals or messages. This is disadvantageous in cases of realtime communication protocols, because this search step on a plurality of frequencies is relatively time-consuming and during this time the radio station is unable to conduct any normal data communication and as a consequence possibly cannot comply with response times prescribed in the realtime communication protocol.

SUMMARY OF THE INVENTION

It is therefore an object of the invention to provide a wireless network and components for a wireless network that enable a suitable access network node for a radio station to be found more quickly in the wireless network.

This and other objects and advantages are achieved in accordance with the invention by a wireless network in which, in addition to the available selectable data channels, a control communication channel is provided which is distinct therefrom and is used by all the access network nodes in the wireless network. As a result, it is thus possible, for example, to send messages or transmit signals which enable a radio station to select a suitable access network node over said control communication channel. As a result, a radio station is no longer required to check through different channels corresponding, for example, to different frequencies in a WLAN network. Instead it is sufficient if the radio station monitors the one control communication channel to select a suitable access network node. This enables faster selection of a suitable access network node for a radio station.

Wireless networks can be, for example, WLAN networks, e.g., conforming to the IEEE 802.11 standard, or WiMAX networks, e.g., conforming to the IEEE 802.16 standard, or comparable networks, e.g., also each conforming to comparable standards. Furthermore, a wireless network can also be, for example, a wireless fieldbus system, e.g., conforming to the WirelessHART standard or to a comparable standard. A wireless network can also be configured as a wireless communication network conforming to a Global System for Mobile Communications (GSM), General Packet Radio Service (GPRS), Universal Mobile Telecommunications System (UMTS) or other similar communications standard.

Access network node is the term used to describe a network node that forms the active and/or prior-ranking communication partner of a radio station in a wireless network. In such a scheme, each radio station in the wireless network is generally assigned one, i.e., precisely one, access network node. In exceptional cases, however, it is also possible to assign a plurality of access network nodes to a radio station (e.g., during the handover of a radio station from one access network node to another access network node). With its assigned access network node, a radio station can communicate, for example, not only with other radio stations in the wireless network, but also with external communication partners that are connected to the wireless network over an Ethernet, for example.

Such access network nodes can be, for example, what are termed "access points" in a WLAN or Worldwide Interoperability for Microwave Access (WiMAX) network or in similar radio networks conforming to one of the aforementioned standards or to a similar standard. Furthermore, such an access network node can also be a base station of a mobile communication network or a comparable device. An access network node can be connected to an external communication network, for example, over a wired or wireless link, e.g., through a further wired or wireless interface. However, the wireless network can also comprise a standalone network, without a connection to an external communication network.

An access network node can also be specified on a temporary basis, e.g., in cases of an ad-hoc network in which assignments of this kind are often not defined until the network is set up and can also be changed again.

In an embodiment, an access network node uses one data channel for communicating with all its assigned radio stations. Alternatively, an access network node uses different selected data channels for different radio stations assigned to the access node.

A data channel can be provided, for example, for transmitting payload data and/or control data. Such control data can be, for example, data and parameters for communication management (e.g., channel parameters), authentication, encryption or similar. What is generally understood by a radio channel, communication channel and/or data channel is a communication channel which is defined, for example, by a radio frequency, i.e., only by one radio frequency. Data channels of this kind are used, for example, in WLAN systems conforming to one of the aforementioned standards or in similar systems. Furthermore, in addition to or instead of a radio frequency, a radio communication channel can also be defined via a specific time sequence of frequencies used (i.e., "hopping"), with a specific timeslot or with corresponding encoding. A wireless network can also be configured, for example, such that at least temporarily no radio station is assigned to one access network node or even to both access network nodes.

The control communication channel can also be defined as explained above in relation to a data channel.

The access network node can also be configured for receiving messages over the control communication channel, as well as for wirelessly sending information messages over the control communication channel. Equally, the radio station can also be configured for wirelessly sending messages over the control communication channel, as well as for receiving the control communication channel. However, the access network nodes can also be configured such that they only wirelessly send on the control communication channel. In an alternative embodiment, the radio station is configured to only receive the control communication channel.

The information message can comprise, for example, a heartbeat telegram. Here, the information message, can include, for example, identification information relating to the transmitting access network node, such as a network address, a logical address or a network node name. The information message can be configured, for example, as a "beacon frame" in accordance with the IEEE 802.11 standard or similar.

The aforementioned object is also achieved by an access network node for a wireless network in accordance with the invention, where the access network node is configured for wireless communication with a radio station assigned to access network node in the wireless network over a data channel selected from the set of available data channels, and for sending information messages over the control communication channel. Here, the access node can, in turn, be configured such that the access network node communicates over the selected data channel with all the radio stations assigned to the access node or such that the access network node communicates with different radio stations assigned to the access node over different data channels.

The access network node, the wireless network, the radio station, the data channels, the control communication channel and the information message can thus also be configured in accordance with the disclosed embodiment.

An access network node of the contemplated embodiment also offers the advantage that by way of the separate data and control channels it is possible to send information messages suitable for selecting an access network node on the common control communication channel and thereby enable the radio stations to obtain such information relating to all the access network nodes located within radio coverage range by monitoring just one radio channel. In the case of such a "scan", corresponding radio stations can thus dispense with switching between different channels, for example, different radio frequencies, and so gather the necessary information more quickly.

In an advantageous embodiment, the access network node includes a first transmit/receive unit for wirelessly communicating over the selected data channel and a second transmit unit for wirelessly sending the information messages over the control communication channel. Here, the transmit unit for sending the information messages over the control communication channel can comprise, for example, a transmit-only unit or as a transmit/receive unit.

Such separate radio units offer the advantage that the data communication can occur when the selected data channel, in parallel with the communication over the control communication channel. As a result, the data communication is subject to no interference due to the information messages of the control communication channel, thereby particularly facilitating the coordination of the access network node's communication with the radio stations assigned to the access network node. The data channels are consequently not loaded unnecessarily with the information messages, and it is possible with a relatively small number of radio stations to cover even extensive areas with few channels. Moreover, it is also possible to operate larger-scale wireless networks, because the number of data channels is no longer influenced by sending the information messages.

Furthermore, the first transmit/receive unit can be assigned a first antenna and the second transmit unit can be assigned a second antenna, when the first and second antenna have identical or similar antenna characteristics. Here, the word "identical" connotes identical within the customary fabrication, measurement and/or adjustment tolerances. Similar antenna characteristics are present when the differences between the antenna characteristics are so small that the advantages described below continue to be achieved or to be achievable.

In accordance with the contemplated embodiment, the information messages are advantageously sent over the control communication channel with the same field strength distribution and form a comparable radio field as occurs with data messages over the selected data channel. In this way, an assessment of the quality of an access network node by a radio station, for example, by evaluation of information messages, also subsequently corresponds to the quality of the received data messages. Consequently, in the choice of an advantageous access network node based on the information messages sent by the access network node, the corresponding advantages of the access network node are also directly transferable to the communication on the assigned data channel. Consequently, improved selection of a preferred access network node can be achieved.

It can furthermore be provided that the information messages sent over the control communication channel include identity information relating to the access network node. In this context, identity information can be any kind of information based on which a recipient of the information messages can identify the transmitting access network node. It can be, for example, a network address, a symbolic address, a symbolic name or a device designation of the respective access network node. Information messages of this kind can also comprise, for example, "beacon frames" for a WLAN network, e.g., conforming to the IEEE 802.11 standard, or as comparable message formats.

In this way, a recipient can identify the sending access network node and, for example, assign to the sending access network node assessment criteria derived from the information messages for the transmitting access network node.

The information messages sent over the control communication channel can also be transmitted, for example, with a predefined or predefinable transmit intensity, power or field strength. The transmit intensity, power or field strength can, for example, also be communicated to a recipient, such as a radio station in the wireless network. In this way, it is possible for a recipient, e.g., a radio station, to determine the quality of a radio link between a transmitting access control point and the radio station based on the intensity of the received signal. The quality of the radio link can be determined, for example, by comparing the receive intensity with the original transmit intensity.

In an exemplary embodiment, all the access network nodes of the wireless network use a standardized predefined transmit intensity for the information messages sent by them, so that a radio station can assess the quality of the wireless transmission to the individual access network nodes from which it has received information messages solely by comparison of the receive intensities of the corresponding information messages.

The quality of a radio link between an access network node and a radio station can also be determined in the access network node or a network controller disposed behind the access network node, in that, for example, the radio station receiving the information message sends the receive intensity of the information message back to the assigned access network node.

The information messages can also be transmitted, for example, in accordance with a predefined or predefinable time pattern. For example, an access network node can transmit an information message at regular intervals, such as every 5 ms, every 10 ms, every 50 ms or even every 100 ms, even every second where appropriate. A time pattern can also be configured such that within a predefined time span precisely one information message or else at least one information message is sent, without the precise time instant having to be specified. A time pattern can also be any planned, plannable or variable sequence of transmit time instants for an information message. An appropriate time pattern can also be triggered or influenced, for example, by the reception of a message from a radio station, another access network node, a network controller or another communication partner.

In an advantageous embodiment, the access network node has a communication control unit which is configured for sending communication polling messages to a selection of radio stations assigned to the access network node in the wireless network, i.e., over the selected data channel, such that in a predefined or predefinable time period or in accordance with a predefined or predefinable time pattern, each radio station from the selection of radio stations receives at least one communication polling message. The predefined or predefinable time pattern can be embodied and provided, e.g., as described in the foregoing description.

A communication polling message can be, for example, a message which polls the receiving or addressed radio station to check whether the respective radio station needs to send data to the access network node. The communication polling message of the receiving and/or addressed radio station can also open a time window for sending data to the access network node.

The selection of radio stations assigned to the access network node can be, for example, all radio stations assigned to the access network node, it can be only radio stations that satisfy certain selection criteria, e.g., which fulfill specific technical or content-related requirements (e.g. support a specific protocol, support realtime protocols, have a specific security level or security protocols or similar) or also only individual selected radio stations or even only one individual radio station.

The predefined or predefinable time period can be a permanently predefined time span in which a radio station from the selection of radio stations receives precisely one or at least one such communication polling message. Such schemes for sending communication polling messages can be provided, for example, in realtime communication protocols in which a response time to specific events that is predefined in the protocol must be achieved. The presently contemplated embodiment achieves a system in which every radio station is also afforded the possibility to respond within a predefined time period. Predefined or predefinable time periods of this kind can be, for example, 32, 64 or 128 ms.

In general, with any use of such time periods and time patterns, a synchronization may be performed between the access network node(s) and the corresponding radio station (s) so that they have the same or a comparable time base. In this case, a timing synchronization function (TSF) conforming to the WLAN standard, e.g., conforming to IEEE 802.11, can be used for example.

In a further advantageous embodiment of the invention, the predefined or predefinable time pattern for sending the information messages can be provided such that, compared to the predefinable or predefined time period for sending the communication polling messages, a radio station receives—at least on average per time period—more information messages than communication polling messages. When information messages and communication polling messages are sent at regular intervals, the time gap between two succeeding information messages sent by an access network node will be as a consequence shorter than the time gap between two communication polling messages sent or addressed to a specific radio station. As a result, a radio station can, with a high degree of probability, also receive information messages between two communication polling messages.

Furthermore, the communication control unit of the access network node can be configured such that no communication polling message will be sent to the radio station during a blocking time period assigned to an assigned radio station. The blocking time period or the characteristic data therefor and/or trigger information therefor can be transmitted, for example, from the radio station to the access network node.

In accordance with the presently contemplated embodiment, a radio station, thus will have a predefined or predefinable time period available in which it can perform other activities, such as monitoring the control communication channel and at the same time there is no risk that the radio station will miss a communication polling message from the assigned access network node. If, for example, one or more communication polling messages were to be missed, i.e., within a realtime protocol, the realtime characteristics of the communication could be adversely affected.

The predefined or predefinable time period can be a fixed time period predefined in the system or an externally adjustable time period. Such a time period can be set, for example, by a user or also over a network controller. Thus, for example, a user can select such a communication polling message rhythm within the framework of different realtime protocols.

In another advantageous embodiment of the invention, the access network node can have a wireless or wired interface to a further access network node in the wireless network, the access network node and the further access network node being configured such that if a radio station assigned to the access network node changes to the further access network node as its new assigned access network node, data relating to the radio station will be transmitted to the further access network node through the wireless or wired interface.

Analogously, an embodiment can also be provided such that when a radio station assigned to the further access network node switches to the access network node, the data relating to the radio station is transmitted to the access network node through the wireless or wired interface.

Data relating to the radio station can be, for example, the "context" provided in a WLAN network. Data relating to the radio station can include, for example, a device name, device features, device settings, available channels, communication parameters used for the communication with the assigned access network node and/or channel parameters. Furthermore, such data relating to the radio station can also include data still to be transmitted by the last assigned access network node or data already transmitted but not yet acknowledged by the radio station.

The transmission from the previous access network node to the further access network node can occur, for example, on the initiative of the further, new access network node for a radio station (e.g., retrieved or "polled") or also to the new access network node on the initiative of the original, old access network node of a radio station.

The aforementioned object is also achieved by a radio station for a wireless network in accordance with the invention for communicating with an access network node assigned to it according to the present description, where the radio station is configured for data communication with its assigned access network node over the selected data channel and for receiving information messages over the control communication channel.

An example of an assignment of an access network node and a radio station to each other is for example the "association" of a "WLAN access point" (an example of an access network node) with a "WLAN client" (an example of a radio station) in a WLAN network (an example of a wireless network).

As explained in the foregoing, such a radio station has, for example, the advantage that the polling of access network nodes located in the environment of the radio station is simplified, since the access network nodes, or at least some of them, send information messages on a common control communication channel and the radio station can thus receive and evaluate information messages from all of these access network nodes solely by monitoring the common control communication channel. No switching between different data channels and/or radio frequencies used by the individual access network nodes is necessary in this case, for example. As a result, finding a preferred access network node radio station or also initiating a transition from an assigned access network node to a more suitable access network node (e.g., the "handover") is simplified.

The radio station can also be configured for sending information relating to a blocking time period, i.e., information relating to the selected data channel, to its assigned access network node. It can be provided that during such a blocking time period, the radio station performs, seeks to perform or plans at least inter alia a poll of the control communication channel.

The blocking time period can be predefined in the radio station, for example, by a start and an end time instant or else by a start time instant and a length. The start time instant can be determined, for example, by the radio station or indirectly or directly by a signal received form an external source, e.g., a trigger signal or a message from the access network node. For example, the blocking time period can be at least indirectly predefined by the reception of a communication polling message in accordance the present invention from the assigned access network node.

The sent information relating to the blocking time period can include, for example, information relating to the start time instant and the end time instant, information relating to the start time instant and the length, or similar determining parameters for the blocking time period. Furthermore, certain of the parameters may also be known to the assigned access network node, so the information relating to the blocking time period need only include the missing items of information. The information relating to the blocking time period may also contain only the information that a blocking time period is now planned and/or provided in accordance with information already present in the access network node, for example.

The presently contemplated embodiment permits simplification of the polling of available access network nodes for a radio station, because as a result of communicating the blocking time period to the access network node it is known to the access network node when the radio station is not ready or could be ready to receive any data messages, e.g., a communication polling message. In this way, the radio station can be sure, in a realtime protocol, for example, that no such communication polling message will be sent to it during the blocking time period, and it is therefore possible for the radio station, for example, to monitor the control communication channel without missing such a message.

The radio station can also be configured for sending a response data message over the selected data channel to its assigned access network node in reply to a communication polling message received from the assigned access network node. It can be provided, for example, that within a predefined or predefinable time window after receiving a communication polling message the radio station will or can send one or more response data messages to the access network node. For example, the time window and/or the start time of the time window can be predefined within the wireless network, specified by the access network node and communicated to the radio station, and/or specified in the radio station itself.

The response data message can contain any kind of information, data or parameters that the radio station seeks to send at the present time instant to the access network node and if necessary a communication partner indirectly or directly connected thereto. Furthermore, it can be provided that the communication polling message requests specific information and/or a specific data category and the radio station then sends back the corresponding data or information.

In this way, orderly communication can be achieved within a wireless network, i.e., within the radio stations assigned to an access network node, because, for example, the radio stations then no longer have to transmit at random or, as the case may be, constantly check the selected data channel to determine whether they can now send messages. Instead, the radio stations simply await the corresponding prompt from the access network node, and the access network node consequently controls the data communication of the individual radio stations. Realtime protocols, for example, can be implemented more easily in such wireless networks in this way, because the time limits to be complied with by the realtime protocol can be maintained and monitored or controlled more effectively by the corresponding polling rhythm of the access network node.

The response data message to the access network node can also include, for example, the above-explained information relating to the blocking time period. In this way, a radio station has the possibility of notifying the assigned access network node on a regular or irregular basis when, for example, the assigned access network node is not ready to receive communication polling messages or other messages due to performing other tasks during the blocking time period, for example, at least inter alia monitoring and/or evaluating the control communication channel.

In an advantageous embodiment, the radio station is configured for evaluating information messages received over the control communication channel such that received information messages are each assigned or can be assigned to the transmitting access network nodes. In this way, it is possible for the radio station to assign the different information messages and if necessary their contents or evaluation to the transmitting access network nodes. In this way, the information messages, although transmitted over a common control communication channel, are nonetheless used for assigning specific information to specific access network nodes.

In particular, the radio station can include a device for determining a preferred access network node using received information messages. For example, the device can include a further device or a module for analyzing the receive field strength or intensity of a radio signal assigned to a received information message. In addition, characteristics such as noise, jitter, delays and/or any combinations thereof in such a received signal are also or can also be evaluated by the device or module. Furthermore, the device can also include an additional device or further module for capturing the contents of a received information message.

The preferred access network node can be determined, for example, based on a best receive field strength or intensity of a radio signal assigned to a received information message. Furthermore, the aforementioned further parameters can also be taken into account in the determination of a preferred access network node. In addition, the contents of a received information message can also be taken into account in the selection of a preferred access network node, such as the protocols, security standards and/or further security criteria supported by the access network node.

In this way, the information messages of a radio station that are sent on the common control communication channel can enable or at least facilitate the determining of a preferred access network node. The information messages of different access network nodes are transmitted on the same control communication channel. As a result, the radio station is not required for that purpose to jump back and forth between different channels, for example, different frequencies. As a result, such a selection is performed more easily and faster.

The radio station can then additionally be configured such that the radio station initiates a handover to the preferred access network node when the determined preferred access network node does not correspond to the currently assigned access network node. The radio station can also be configured such that the radio station initiates a handover under the aforementioned condition only if further handover conditions are fulfilled. Such further handover conditions can be, for example, that the preferred access network node is superior to the currently assigned access network node for a relatively long time period. In this case, a corresponding time constant can be set up such that thereafter it can be assumed that the preferred access network node will be advantageous not only in the short term but will be advantageous in the longer term, so that a corresponding handover to the access network node as the assigned access network node makes sense. Further handover conditions can also be, for example corresponding protocols, protocol standards and/or corresponding security characteristics of the preferred access network node.

Initiating such a change of access network node can include, for example, the sending of information relating to the preferred access network node to the currently assigned access network node or also the preferred access network node. Furthermore, initiating the change of access network node can also entail the sending of a message to the currently assigned access network node and/or the preferred access network node to the effect that such a change of the assigned access network node (i.e., a "handover") is initiated.

Apart from the aforementioned conditions for such a change of assigned access network node for a radio station, further criteria can also be stored in the wireless network, the access network node and/or the radio station, based on which such a change can, is to be or is also performed, possibly also independently of the aforementioned criteria.

The aforementioned object is also achieved by a wireless network in accordance with the present invention having at least two access network nodes in accordance with the disclosed embodiments as well as at least one radio station in accordance with the disclosed embodiments.

Furthermore, the at least two access network nodes can be connected through a wireless or wired interface to allow communication between the at least two access network nodes. Such a wired interface can be, for example, an Ethernet interface or a comparable interface. Moreover, such interfaces can also be all currently established parallel or serial interfaces for transmitting between devices and/or communications equipment. Thus, for example, the data relating to a radio station that switches from one access network node to another access network node can be transmitted through this or such an interface between the access network node and the further access network node.

The aforementioned object is also achieved by a method for assigning a radio station in accordance with the invention to an access network node in accordance with the disclosed embodiments in a wireless network in accordance with the disclosed embodiments, where the radio station is assigned to a first access network node and a second access network node is present in the wireless network, where furthermore a) the radio station receives and evaluates information messages of the first and/or second access network node sent over the control communication channel, and b) the radio station determines a preferred access network node at least inter alia using the result of the evaluation of the information messages.

The evaluation of the information messages and the resulting determination of a preferred access network node can be performed, for example, as already explained in more detail at another point in the present description.

It can furthermore be provided that after method step b):

c1) the radio station sends an information message relating to the preferred access network node to the first and/or second access network node if the second access network node has been identified as the preferred access network node.

Alternatively or in addition to step c1), after method step b):

c2) the radio station can also send a message for initiating a handover to the second access network node as the assigned network node to the first and/or second access network node.

In this case, the method steps cited under c1) and c2) can be performed in accordance with the contemplated embodiments as already explained at other points in this description.

Within the described method, it can also be provided that for the handover of the radio station from the first to the second access network node as the access network node assigned to the radio station, data relating to the radio station is transmitted from the first to the second access network node, for example, through the aforementioned interface (e.g., an Ethernet interface) between the two access network nodes. The data relating to the radio station can be configured, for example, as previously described in more detail. Here, the transmission can be performed in response to a request from the second access network node or on the initiative of the first access network node.

The data relating to the radio station can be transmitted, for example, before the commencement of the actual data traffic, i.e., payload data traffic, between the newly assigned second access network node and the radio station. The transmission of the data relating to the radio station can occur, for example, before the actual assignment of the radio station to the second access network node, during the assignment process or shortly thereafter, but before the commencement of the actual data transmission, specifically the payload data transmission.

The present invention describes a wireless network together with access network nodes and radio stations for such a network that permits a simplified and improved assignment of the radio stations in the wireless network to corresponding access network nodes. In this arrangement, a common control communication channel for the access network nodes is provided by which the access network nodes send information messages. The control communication channel is different from the data channels otherwise used by the access network nodes for data communication, i.e., payload data communication, with the radio stations. In this way it is possible, for example, to send information necessary for determining a preferred access network node over the common control communication channel without disrupting the data communication of the access network nodes with their assigned radio stations. Furthermore, the radio stations henceforth have to monitor only one channel for all the access network nodes, for example, in order to determine a preferred access network node and do not have to switch back and forth in a relatively time-consuming and resource-intensive manner between different radio channels in order to perform such an investigation or search.

Accordingly, advantages of the present invention are, for example, that the data channels of the access network nodes are no longer loaded with heartbeat telegrams. As a result, it is possible with a relatively small number of radio stations also to cover extensive areas with few data channels. A further advantage can be that the radio stations can periodically run a background scan. By way of such a scan, a radio station can proactively find out in a relatively short time whether there is in its vicinity possibly a better access network node to which it can connect. It can also be advantageous that the number of data channels used can no longer affect the aforementioned time for a background scan of the available access network nodes and therefore where appropriate larger-scale wireless networks can now also be operated using the present invention. Due to the separation of the data channels from the control communication channel, the wireless network is furthermore no longer as susceptible to external sources of interference, and now channels can also be used on which a radar detection occurs. In this case, it can be provided, for example, that the control communication channel is not a channel on which a radar interference could be present.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to the attached figures, in which.

DETAILED DESCRIPTION OF THE PRESENTLY PREFERRED EMBODIMENTS

Figure 1:
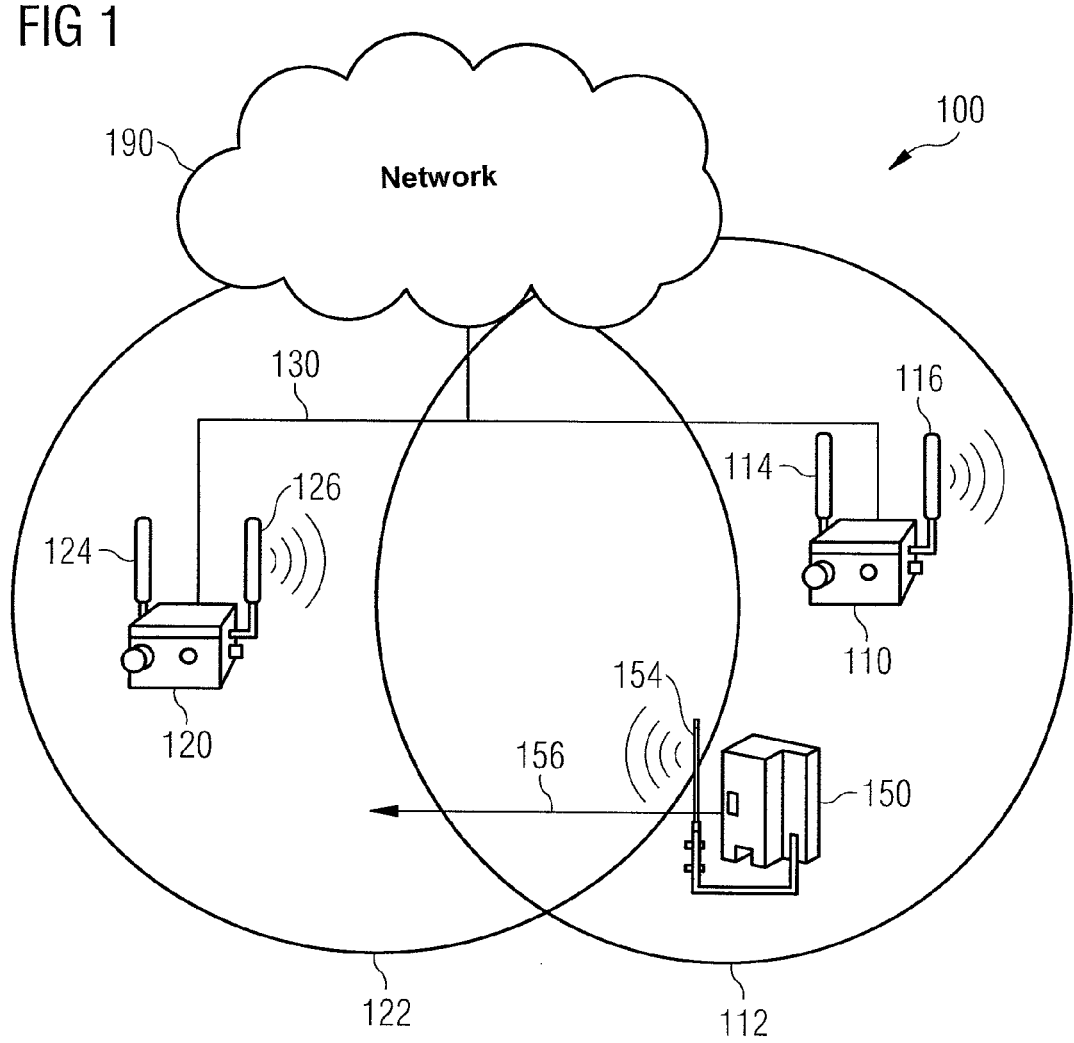
FIG. 1 shows an example of a WLAN network.

FIG. 1 shows a WLAN network 100 conforming to the IEEE 802.11 standard having a first "WLAN access point" 110 and a second "WLAN access point" 120 as well as a "WLAN client" 150. In this scheme, the access points are examples of an access network node in accordance with the present invention, while the WLAN client is an example of a radio station in accordance with the present invention. Each of the access points 110, 120 has two antennas 114, 116, 124, 126, the antennas 114, 116 of the first access point 110 covering a radio field which is designated by a circle 112 in FIG. 1 and the antennas 124, 126 of the second access point 120 covering a radio field which is symbolized by a circle 122 in FIG. 1.

The client 150 includes an antenna 154 which is located relatively centrally in the radio field 112 of the first access point 110 and at the edge of the radio field 122 of the second access point 120.

The access points 110, 120 are connected to each other and to a background network 190 by an Ethernet connection 130. The background network 190 can comprise, for example, further access points, control devices or also a gateway to other networks, such as to the Internet, or similar.

Each of the access points 110, 120 has two transmit and receive units, where in each case a first transmit and receive unit to which one of the antennas 114, 124 of the access points 110, 120 is assigned in each case is used for data communication with the client 150 or further radio stations. A second transmit and receive unit to which the other antenna 116, 126 of the access points 110, 120 respectively is assigned in each case is used to send, at short time intervals, such as every 5 ms, a heartbeat telegram on a management channel which is distinct from the data channels that are available to the access points 110, 120. The data channels and the management channel are each different from one another by virtue of the central transmission frequencies. The information message can comprise, for example, a beacon frame in accordance with to the WLAN standard IEEE 802.11.

The data communication of the first access point 110 is conducted over a first data channel, while the data communication of the second access point 120 occurs over a second data channel that is distinct from the first data channel. The two access points 110, 120 send the aforementioned heartbeat signals at intervals of, for example, 5 ms on the management channel. In this case, the aforesaid data channels correspond to examples of selected data channels in accordance with the present invention, while the management channel described here is an example of a control communication channel in accordance with the present invention.

In order to determine a preferred access point 110, 120, the client 150 reads the management channel at regular time intervals and determines the input field strength or input intensity of the heartbeat signals coming from the access points 110, 120. In the present example, in which the client is located relatively centrally in the radio field 112 of the first access point 110 and at the extreme edge of the radio field 122 of the second access point 120, the intensity of the heartbeat signal from the first access point 110 is significantly greater than the intensity of the heartbeat signal from the second access point 120. While this remains the case, the client 150 selects or retains the first access point 110 as its associated access point and handles the communication, with a communication partner located in the background network 190 for example, through the first access point 110.

Following a displacement of the client 150 as indicated by the arrow 156 in FIG. 1, however, the intensity of the heartbeat signals from the first access point 110 would significantly decrease after the end of the arrow is reached, whereas the intensity of the heartbeat signals from the second access point 120 would increase and also exceed that of the heartbeat signals from the first access point 110.

As soon as the client 150 realizes that the second access point 120 is supplying the stronger signals, the client 150 sends a message to the second access point 120 requesting its handover to the access point as the new associated access point. A handover from the first access point 110 to the second access point 120 as the access point responsible for the client 150 thereupon occurs in accordance with the usual procedures in the WLAN standards. Here, for example, the "context" stored in the first access point 110 for communication with the client 150 is also transmitted over the Ethernet interface 130 to the second access point 120. Also transmitted here is the data still stored in the first access point 110 and provided for transmission to the client 150, as well as possibly also the messages which have already been sent to the client 150, but have not yet been acknowledged by the client 150.

Further reasons or methods for the handover can also be provided in the WLAN network 100 or the client 150 and/or the access points 110, 120 in addition to the aforementioned handover method based on the analysis of heartbeat telegrams of the access points 110, 120. Thus, for example, a client can initiate a handover to another access point if the client 150 can no longer send data or data telegrams successfully to the access assigned point.

In the present WLAN network 100, a realtime protocol is provided according to which each access point 110, 120 sends polling messages (i.e., "polls") on the selected data channel at regular time intervals to all its assigned clients 150, thereby providing the assigned clients 150 the possibility of subsequently sending back data or information. Here, the interval between the polls is dependent on the parameters of the realtime system and can amount to, for example, 32, 64 or 128 milliseconds.

Figure 2:
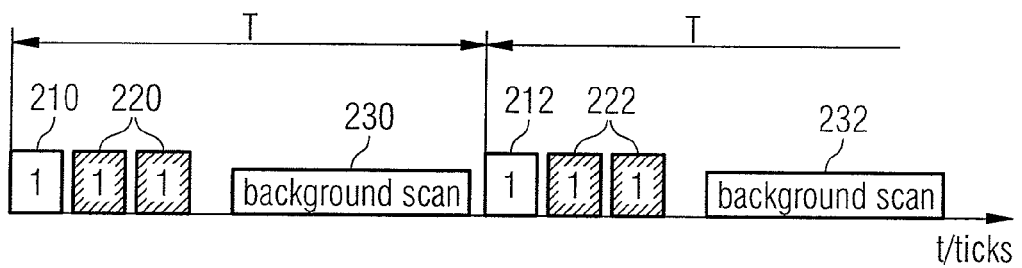
FIG. 2 shows an exemplary timeline for data transmission and background scan in a radio station.

FIG. 2 shows an exemplary timeline within a client 150 in such a WLAN network. Shown on the horizontal axis is a timescale on which different incoming signals or activities of the client 150 are represented. The illustration begins with the start of a cycle that commences with a polling message 210 from the assigned access point 110. Due to this polling message, the client 150 can then send data to the access point 110 over the selected data channel.

Also provided are two optional further polls 220 with which an access point can, if necessary, retrieve further data from the client if such data is present or the client requests this data to be sent. Following these polls, the client can then once again send data to the access point.

Also provided is a time span 230 in which the client 150 monitors the management channel in the network 100 to determine whether there are better access points for the client 150 than the one to which it is currently assigned. The access point is notified of the location and duration of the background scan window 230 in the response messages to the polls 210 and 220 and the access point sends no further polling messages to the client during this time. After a selectable or predefined time period T, the polling cycle then recommences with a new polling message 212, new additional polling opportunities 222 and once again a time span for polling the management channel 232. The time span T corresponds to the cycle time specified in the realtime protocol and can amount, for example, to 32, 64 or 128 milliseconds.

A further cause for a change of the associated access point can be when a client receives no polling message or poll within twice or two and a half times the cycle time, or when after registering with an access point it receives no poll at all within one cycle time.

The presently described system improves the handover characteristics for a client, because the scan time that the WLAN client requires to find an access point with the best field strength is relatively short, because only one channel has to be monitored for all the access points. The access points 110, 120 in the present WLAN network 100 possess two mutually separate transmit/receive units for the data channel and the management channel. As a result, it is also actually possible to send simultaneously on both channels.

Furthermore, the two antennas 114, 116, 124, 126 of the access points 110, 120 each have the same antenna characteristics. As a result, the field strength distribution of information over the management channel corresponds to that of the communication over the data channel and consequently a handover as a result of the heartbeat signals over the management channel is also appropriate for the data channel.

When the WLAN client 150 performs the background scan represented in FIG. 2, it now only switches to the one management channel and there receives the heartbeats from all the WLAN access points within range. The beacon frames described in the IEEE 802.11 standard are used for this purpose, for example.

In addition, the heartbeat signals include a special information element that identifies the sending WLAN access point as an access point with a separate management channel and simultaneously notifies the client of the frequency and/or address of the data channel of the access point. Moreover, in this way, a client can also learn whether a radar signal has been received on the data channel of the corresponding access point and consequently whether another access point is possibly better suited as a communication partner.

What can be achieved as a result of the above-described shortening of the scan time, as well as the separation of data and management channel, is that the data channels of the WLAN access points are not loaded unnecessarily with heartbeat telegrams and the client can establish in a very short, predetermined time whether there are better WLAN access points in its vicinity to which it can possibly connect. Furthermore the number of data channels can then no longer affect the background scan of the clients, thereby also facilitating or enabling the operation of larger-scale installations. Moreover, the system is then no longer so susceptible to external sources of interference, and channels on which a radar detection occurs can also be used for the data transmission (in which case the management channel should or must be a radar-free channel).

Figure 3:
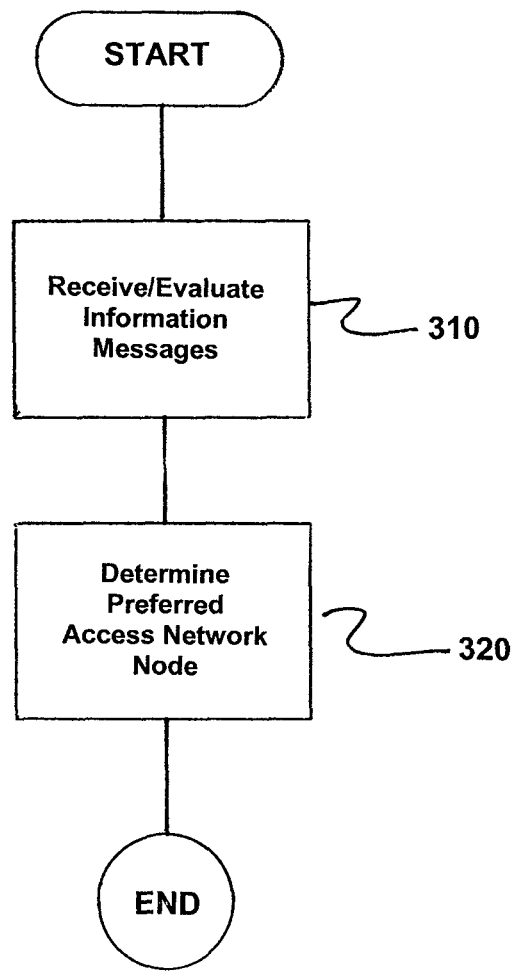
FIG. 3 is a flowchart in accordance with an embodiment of the invention.

FIG. 3 is a flow chart of a method for assigning a radio station to an access network node in a wireless network, where the radio station is assigned to a first access network node in the wireless network and a second access network node is included in the wireless network. The method comprises receiving and evaluating, by the radio station, information messages of at least one of the first access network node and the second access network node sent over the control communication channel, as indicated in step 310. The preferred access network node based on at least a result of the evaluation of the information messages is determined by the radio station, as indicated in step 320.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A wireless network configured for at least one of automation, real-time and industrial applications, comprising:
a plurality of access network nodes, each of the plurality of access network nodes including a first transmit/receive unit for radio communication over a selected data channel and a second transmit unit for sending heartbeat messages configured as a beacon frame over a control communication channel; and
at least one radio station for wireless communication with at least one of the plurality of access network nodes;
wherein each of the plurality of access network nodes utilizes a data channel selected from a set of available selectable data channels for wireless communication with a radio station of the at least one radio station assigned to the each of the plurality of access network nodes;
wherein the control communication channel is distinct from the selectable data channels, each of the plurality of access network nodes being configured for wirelessly sending the heartbeat messages configured as the beacon frame over the control communication channel, the beacon frame including an information element which identifies a sending access point as an access point having a separate management channel and simultaneously notifies a client of the selected data channel of the access point, and the at least one radio station being configured for receiving the control communication channel; and
wherein the first transmit/receive unit is assigned a first antenna and the second transmit unit is assigned a second antenna, the first and second antennas having identical or similar antenna characteristics.

2. The wireless network as claimed in claim 1, wherein the plurality of access network nodes are connected by a wireless or wired interface for communication between the plurality of access network nodes.

3. An access network node for a wireless network, comprising:
a first transmit/receive unit for radio communication over the selected data channel; and
a second transmit unit for sending the heartbeat messages configured as the beacon frame over a control communication channel;
wherein the first transmit/receive unit is assigned a first antenna and the second transmit unit is assigned a second antenna, the first and second antennas having identical or similar antenna characteristics; and
wherein the access network is configured for radio communication with a radio station in the wireless network over a data channel selected from a set of available data channels and is configured for sending the heartbeat messages configured as the beacon frame over the control communication channel which is distinct from the set of available data channels, the beacon frame including an information element which identifies a sending access point as an access point having a separate management channel and simultaneously notifies a client of the selected data channel of the access point.

4. The access network node as claimed in claim 3, wherein the information messages sent over the control communication channel include identity information relating to an access network node of the plurality of access network nodes.

5. The access network node as claimed in claim 3, wherein the heartbeat messages configured as the beacon frame sent over the control communication channel are transmitted at a predefined or pre-definable transmit intensity.

6. The access network node as claimed in claim 3, wherein the heartbeat messages configured as the beacon frame are transmitted in accordance with a predefined or predefinable time pattern.

7. The access network node as claimed in claim 3, further comprising a communication control unit configured to send communication polling messages to a selection of radio stations assigned to the access network node in the wireless network such that each radio station from the selection of radio stations receives at least one communication polling message within a predefined or predefinable time period.

8. The access network node as claimed in claim 7, wherein the communication polling messages are sent over the selected data channel.

9. The access network node as claimed in claim 7, wherein the control unit is configured such that during a blocking time period assigned to an assigned radio station no communication polling message is sent to the assigned radio station.

10. The access network node as claimed in claim 9, wherein the blocking time period has been or is communicated to the access network node by the radio station.

11. The access network node as claimed in claim 3, further comprising a wireless or wired interface to a further access network node in the wireless network, wherein the access network node and the further access network node are configured such that in a handover of a radio station assigned to the access network nodes to the further access network node as a new assigned access network node of the radio station, at least one of:
data relating to the radio station is transmitted to the further access network node through the wireless or wired interface; and
data relating to the further access network node is transmitted to the radio station.

12. A radio station for a wireless network for communication with an access network node assigned to the radio station, the access node including a first transmit/receive unit for radio communication over a selected data channel and a second transmit unit for sending heartbeat messages configured as a beacon frame over a control communication channel, wherein the radio station is configured for data communication with an access network node assigned to the radio station over a selected data channel and for receiving the heartbeat messages configured as the beacon frame over the control communication channel, the beacon frame including an information element which identifies a sending access point as an access point having a separate management channel and simultaneously notifies a client of the selected data channel of the access point; and wherein the first transmit/receive unit is assigned a first antenna and the second transmit unit is assigned a second antenna, the first and second antennas having identical or similar antenna characteristics.

13. The radio station as claimed in claim 12, wherein the radio station is configured to send information relating to a blocking time period to the access network node assigned to the radio station, and wherein during the blocking time period the radio station performs or attempts to perform at least a poll of the control communication channel.

14. The radio station as claimed in claim 13, wherein the information relating to the blocking time period is sent over the selected data channel.

15. The radio station as claimed in claim 13, wherein the radio station is configured to send a response data message over the selected data channel to the access network node assigned to the radio station in response to a communication polling message received from the assigned access network node.

16. The radio station as claimed in claim 15, wherein the response data message to the access network node includes the information relating to the blocking time period.

17. The radio station as claimed in claim 12, wherein the radio station is configured to send a response data message over the selected data channel to the access network node assigned to the radio station in response to a communication polling message received from the assigned access network node.

18. The radio station as claimed in claim 17, wherein the response data message to the access network node includes the information relating to the blocking time period.

19. The radio station as claimed in claim 12, wherein the radio station is configured to evaluate the heartbeat messages received over the control communication channel such that the received heartbeat messages are assignable to transmitting access network nodes.

20. The radio station as claimed in claim 12, wherein the radio station includes a device configured to determine a preferred access network node using received heartbeat messages.

21. The radio station as claimed in claim 20, wherein the radio station is configured to initiate a handover to the preferred access network node when the determined preferred access network node does not correspond to a currently assigned access network node and further handover conditions are fulfilled.

22. A method for assigning a radio station to an access network node in a wireless network, wherein the radio station is assigned to a first access network node in the wireless network and a second access network node is included in the wireless network, the first and second access nodes each use a data channel selected from a set of available data channels for wireless communication with an assigned radio station, the method comprising:
   a) receiving and evaluating, by the radio station, heartbeat messages configured as a beacon frame of at least one of the first access network node and the second access network node sent over a control communication channel distinct from the set of available data channels, the beacon frame including an information element which identifies a sending access point as an access point having a separate management channel and simultaneously notifies a client of the selected data channel of the access point, the first and second access nodes each including a first transmit/receive unit for radio communication over the selected data channel and a second transmit unit for sending the heartbeat messages configured as the beacon frame over the control communication channel; and
   b) determining, by the radio station, a preferred access network node based on at least a result of the evaluation of the heartbeat messages configured as the beacon frame;
      wherein the first transmit/receive unit is assigned a first antenna and the second transmit unit is assigned a second antenna, the first and second antennas having identical or similar antenna characteristics.

23. The method as claimed in claim 22, further comprising after method step b):
   c1) sending, by the radio station, a heartbeat message relating to a preferred access network node to the at least one of the first access network and the second access network if the second access network node has been identified as the preferred access network node, or
   c2) sending, by the radio station, a message for initiating a handover to the second access network node as an assigned network node to the at least one of the first access network node and the second access network node.

24. The method as claimed in claim 22, wherein data relating to the radio station is transmitted from the first to the second access network node for the handover of the radio station from the first to the second access network node as the access network node assigned to the radio station.

25. The method as claimed in claim 24, wherein data relating to the radio station is transmitted from the first to the second access network node for the handover of the radio station from the first to the second access network node as the access network node assigned to the radio station.

\* \* \* \* \*